W. GAEDE.
HIGH VACUUM ROTARY PUMP.
APPLICATION FILED MAR. 13, 1912.

1,029,862.

Patented June 18, 1912.

WITNESSES
John Murtagh
L. M. Dornau

INVENTOR
Wolfgang Gaede
by Goepel & Goepel
attorneys

UNITED STATES PATENT OFFICE.

WOLFGANG GAEDE, OF FREIBURG, BREISGAU, GERMANY.

HIGH-VACUUM ROTARY PUMP.

1,029,862.  Specification of Letters Patent.  Patented June 18, 1912.

Application filed March 13, 1912. Serial No. 683,518.

*To all whom it may concern:*

Be it known that I, WOLFGANG GAEDE, a subject of the German Emperor, residing at Zasiusstrasse 43, Freiburg-im-Breisgau, Germany, have invented a certain new and useful Improvement in High-Vacuum Rotary Pumps; and I do hereby declare the following to be a full, clear, and exact description of the invention, such as will enable others skilled in the art to which it appertains to make and use the same.

In high vacuum rotary pumps according to my previous application for Letters Patent Serial Number 534,518 filed December 22nd 1909 a body of substantially circular section is rotated at a very high speed in a casing, whose interior is connected on one side with a preliminary pump, and on the other side with a receiver in which the high vacuum is to be produced. Since the shaft connecting the rotating body with the motor provided to drive it must, at least at one side of the pump, pass through the wall of the casing, the interior of the latter is connected to the external air where the shaft enters, by the narrow space between the shaft and its bearing.

The object of my present invention is to make the bearing of the driving shaft sufficiently air-tight more especially in view of the fact that the methods usually employed, such as stuffing boxes, fail at the high speeds necessary for the operation of pumps of this description.

My invention consists in providing a helical groove in either of the bearing surfaces, that is to say the surface of the journal or the surface of the bushing in which it rotates and with reference to direction and degree making the pitch of the groove or its inclination toward the axis of the shaft such, that the oil employed for lubricating the bearing is displaced by the rotation in the opposite direction to that in which the external atmospheric pressure tends to force it. By this means I obtain the result that the lubricating oil itself renders the bearing perfectly air tight, and if the pitch of the grooves is suitably proportioned to the given speed, the oil remains stationary in the bearing during the operation of the pump, and is neither forced inward by the pressure of the air nor driven out by the rotation of the shaft.

Figure 1:
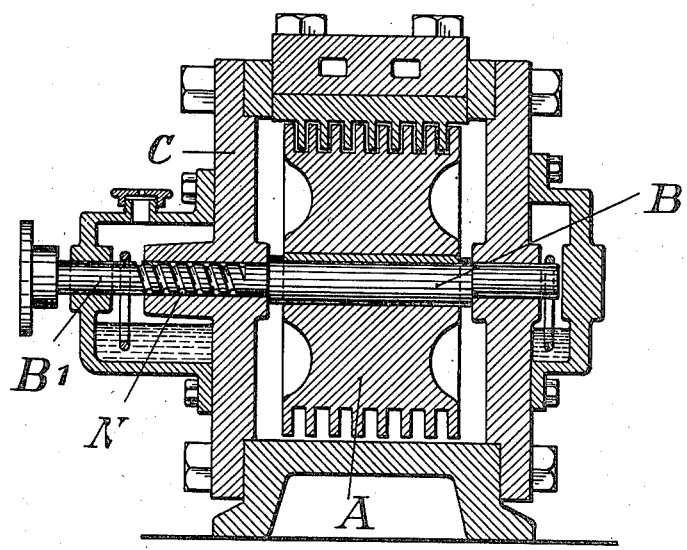
Figure 2:
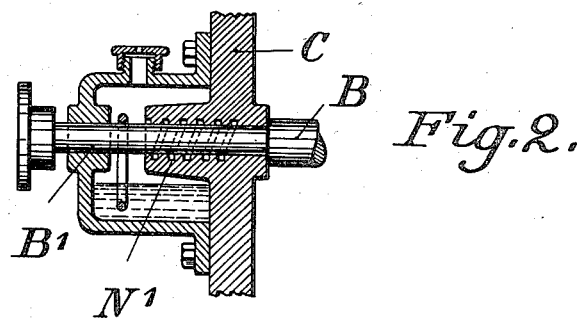

In the accompanying drawings, Figure 1 is a sectional elevation of a vacuum pump according to my present invention and Fig. 2 a detail drawing of a modified form of the portion of Fig. 1, which applies to the invention.

The pump body A rotates on the shaft B in the casing C. In the construction according to my above-mentioned previous application, the bearing oil is gradually forced through the space between the shaft and the bearing by the difference between the internal and external pressures, and finds its way into the interior of the casing, where it soon gives rise to serious disturbances. If the operation of pump is continued it can even happen that air is forced in after the oil and acts to lower the vacuum and thus to decrease the efficiency of the pump.

According to my present invention a groove N is cut on the journal B' of the shaft B, and is inclined at such an angle to the axis of the shaft, that with the given direction and speed of rotation the axial displacement of the lubricating oil, due to the inclination of the helical groove, is equal and opposite to that due to the external air pressure. By this means not only is the oil prevented from entering the pump, but the bearing is also rendered perfectly air-tight.

Instead of cutting a groove N in the surface of the journal B' a groove N' can be formed in the inner surface of the bearing, as shown in Fig. 2. In this case the pitch must be in the opposite direction in order to produce the desired effect.

The cross section of the grooves N or N' may be of different size and shape and instead of one groove, several parallel grooves or several portions of grooves separated by smooth portions may be provided, without altering the main feature of the invention, if they are so arranged and proportioned as to fulfil the above stated conditions.

Having now particularly described and ascertained the nature of my said invention and in what manner the same is to be performed, I declare that what I claim is:

1. In high vacuum pumps consisting of a casing, and a body of circular section journaled to be rotated in said casing by means of a shaft projecting through the wall of the casing, a helical groove fashioned in the bearing surface of said shaft and having an inclination toward the axis of the shaft to outwardly displace lubricating oil introduced between the shaft and the bearing.

2. In high vacuum pumps consisting of a casing and a body of circular section journaled to be rotated in said casing by means of a shaft projecting through the wall of the casing a helical groove formed on the surface of that part of the said shaft which forms the bearing journal passing through the wall of the casing, said groove being inclined toward the axis of the shaft to displace outward oil introduced between the shaft and the bearing.

In testimony, that I claim the foregoing as my invention, I have signed my name in presence of two subscribing witnesses.

WOLFGANG GAEDE.

Witnesses:
HERM. VON DERHARD,
WILHELM HAMMER.